Dec. 20, 1932. J. L. ANDERSON 1,891,880
GAS CUTTING MACHINE
Original Filed Oct. 4, 1929 3 Sheets-Sheet 1

Dec. 20, 1932.    J. L. ANDERSON    1,891,880
GAS CUTTING MACHINE
Original Filed Oct. 4, 1929    3 Sheets-Sheet 3

INVENTOR
James L. Anderson
BY
ATTORNEY

Patented Dec. 20, 1932

1,891,880

UNITED STATES PATENT OFFICE

JAMES L. ANDERSON, OF CLOSTER, NEW JERSEY, ASSIGNOR TO AIR REDUCTION COMPANY, INCORPORATED, OF NEW YORK, N. Y., A CORPORATION OF NEW YORK

GAS CUTTING MACHINE

Application filed October 4, 1929, Serial No. 397,208. Renewed June 22, 1932.

The invention relates to motor-driven, tracer-operated, universal-movement machines for cutting or welding by means of gases, more especially for cutting any desired or irregular shape or opening in metal by means of an oxygen jet.

An object of the invention is to provide a very simple, durable, accurate and convenient machine for these purposes.

This invention relates to that type of machine in which a torch is supported for universal movement in a plane over the work, and a motor-driven tracer is similarly supported for movement over a drawing or in contact with a template, the torch and tracer holders being connected to cause the torch to follow a path similar to that followed by the tracer. In such machines, the nature of the universal motion connections presents various problems.

It is an object of this invention to provide a simple and efficient mechanism for causing a torch to follow a path similar to that followed by the tracer. More particularly, the invention comprises a machine having a torch supported for universal movement over the work, and a tracer supported for movement over a template, and pivotal arms connected by a belt or the like, which compels the torch to follow a path similar to that followed by the tracer. A connection consisting of a metal band is especially advantageous. Some advantages of this plan are economy, simplicity, and the accuracy of reproduction of the cutting or welding that is insured by a take-up device acting on the belt.

The tracer or follower may be of any of the known kinds adapted to operate over a drawing or in conjunction with a cam or template. Special advantages are realized by incorporating in the machine a follower capable of adhering to the inner or outer boundary of a template, more especially a magnetic follower, such as disclosed in Patents Nos. 1,352,760 and 1,324,007, and in the specific aspect the invention presents an improved machine of this character.

Another object of the invention is to improve the electromagnetic template follower part of the machine so as to gain important betterments in respect to the positiveness, uniformity and steadiness with which the cutting and preheating jets are moved over regular or irregular courses, and to afford wider latitude in the design of templates for cutting difficult shapes.

Another object of the invention is to provide an electromagnetic template follower in which the magnetizing coil does not rotate with the follower, and in which the follower is located at the end of the coil remote from the support so that the roller is the only part of the tracer mechanism extending beyond the edge of the template.

Concretely the machine comprises a double arm swung on a center and carrying two other arms hinged or pivoted at its ends, these arms being connected so that they must swing in unison relatively to the double arm, one of the arms carrying the cutting torch and the other arm carrying the electromagnetic follower and the driving motor.

Other objects, features and advantages of the machine will be apparent to those skilled in the art.

In the accompanying drawings, forming part hereof:

Figure 1:
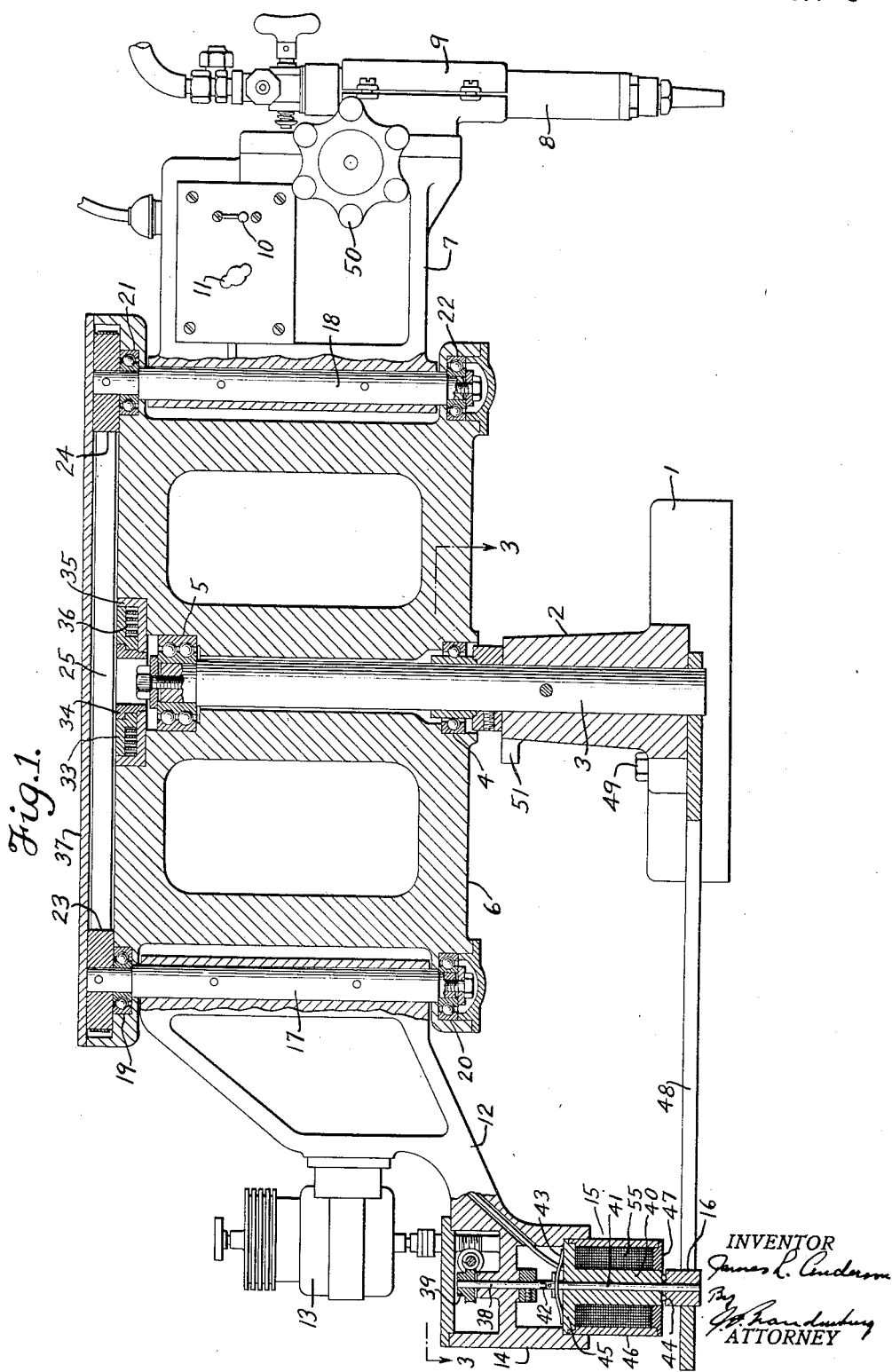
Fig. 1 is an elevation with various sections cut away to show the detail construction.

The machine has a base 1, having a center pedestal 2, carrying a center post 3. On this center post is carried, by means of bearings 4 and 5, a deep double arm 6. At one end of this double arm is hinged a deep arm 7 carrying the downwardly directed cutting torch 8, torch adjuster 9, magnet switch 10 and motor switch 11. At the other end of double arm 6 is hinged a deep arm 12, carrying an adjustable speed electric motor 13, gear box 14, electromagnet 15, and downwardly projecting template follower 16.

These two arms, 7 and 12, are hinged to double arm 6 by the two shafts 17 and 18, which are carried in the double arm 6 by bearings 19, 20, 21 and 22. Shafts 17 and 18 are pinned to the arms 7 and 12 so that any rotation of the shafts rotates the arms. At the top of the shafts are pinned pulleys 23 and 24, which are connected together by a metal band or belt 25. This metal belt transmits the motion of one pulley to the other. To prevent the belt from slipping two pins 26 and 27 are driven through the belt into the pulleys in such a way that the pulleys are allowed to rotate about 175°.

To counteract any unequal expansion or contraction between the double arm 6 and the belt, wear in the bearings or other cause for the development of slack in the belt, a belt-tightening device is provided. This belt-tightening device consists of two rollers 31 and 32 mounted on disc 33, which rotates freely in a cup made up of parts 34 and 35. Cup 35 is fixed solidly in a recess bored in double arm 6. One end of coil spring 36 is fastened to disc 33, and the other end is fastened to cup 35. This coil spring is under tension at all times, tending to rotate disc 33 with its rollers 31 and 32 around part 34, thus maintaining an even tension on belt 25.

Means such as the foregoing for interconnecting the arms 7 and 12 and for automatically and continually taking up slack in the connection are not only very simple but extremely effective in overcoming all lost-motion which would be detrimental to the accuracy of the machine.

Figure 2:
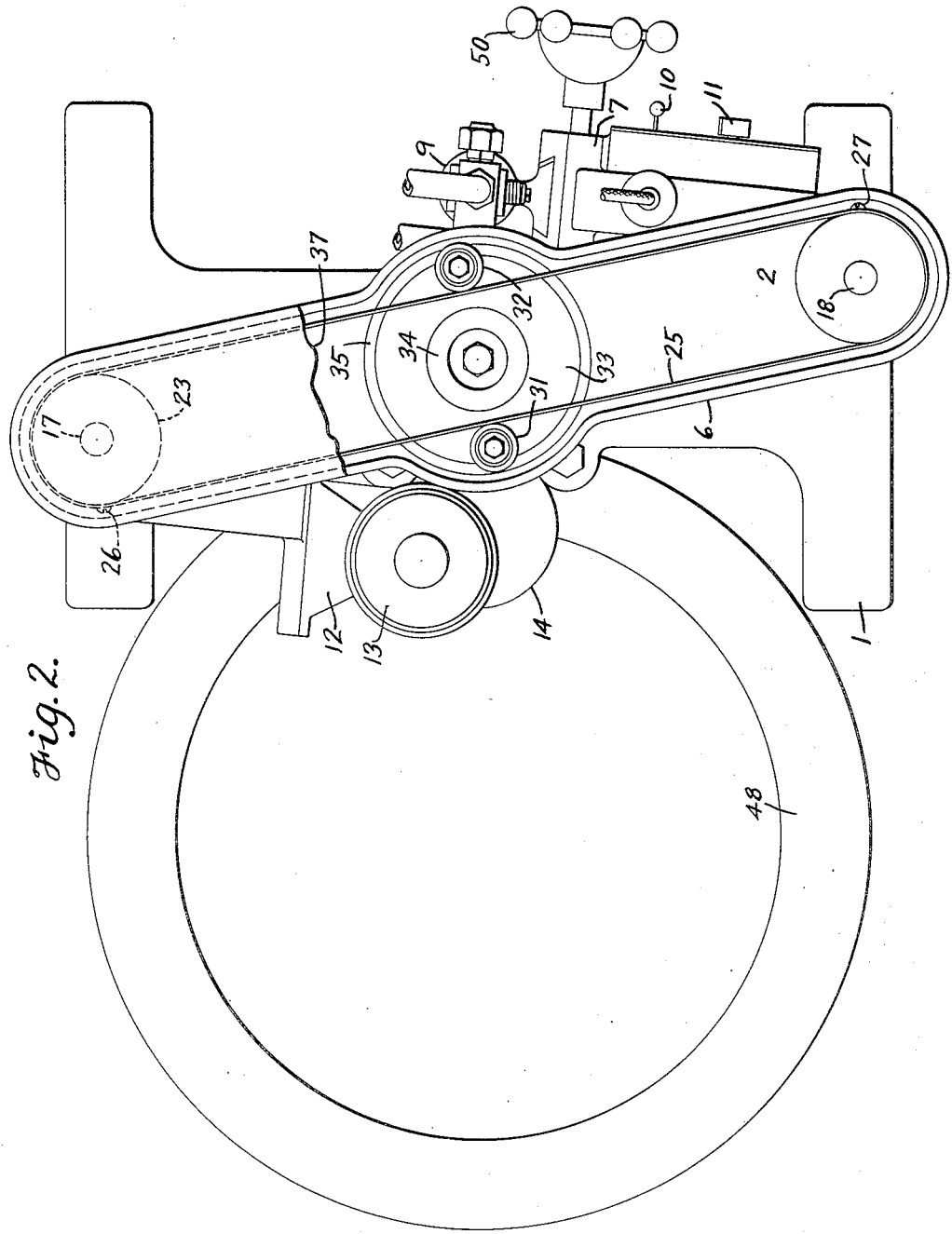
Fig. 2 is a plan view with the arms closed in to their fullest extent.
Figure 3:
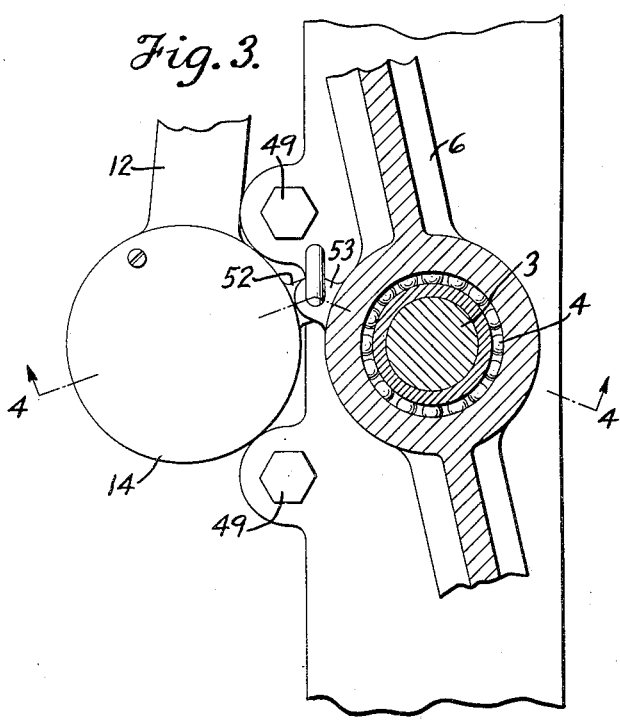
Fig. 3 is a section taken through 3—3 of Fig. 1, but with the magnet arm folded.
Figure 4:
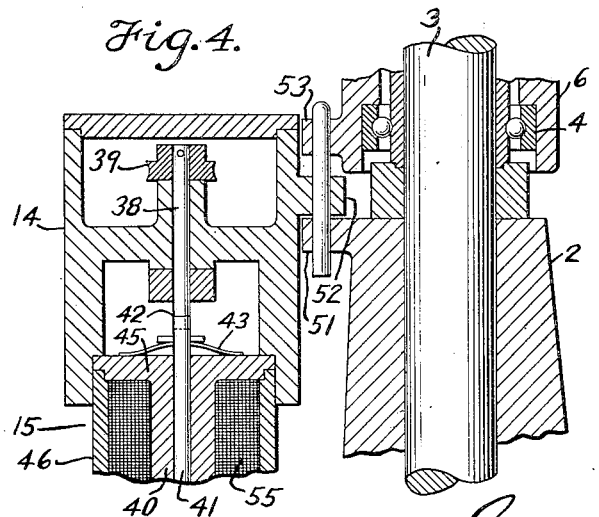
Fig. 4 is a section through 4—4 of Fig. 3.

This belt and belt-tightening device are covered by cover 37, which has been removed in Fig. 2 to show the belt, etc.

The motor 13, when energized, drives a vertical shaft 38 in the gear-box 14 through a double worm reduction gear 39. The electromagnet 15 is fixed in the lower end of the gear-box, and through its central core 40 passes a vertical shaft 41, on the lower end of which the follower 16 is secured. The shafts 38 and 41 are rotatively connected by a tongue and groove joint 42, which allows for any slight misalinement and permits the follower with its shaft to be removed by withdrawing them downwardly. A spring 43 holds these shafts in engagement and the follower 16 up against a bearing 44.

The iron or steel core 40 of the follower magnet has a head 45 to which is fixed a heavy casing 46 of iron or steel surrounding the magnet coil 55, which is non-rotatably contained in the casing 46. An important advantage in having the coil 55 non-rotatable is that the power wires can be connected directly to the terminals of the coil and it is not necessary to use brushes and slip rings as required by tracers in which the coil rotates with the follower. A bottom closure 47 is of non-magnetic material. The core 40 and the casing 46, together with the shaft 41 and the template follower 16, constitute the iron part of the magnet. The magnet is connected to the supporting arm 12 and the tracer roller 16 is located at the end of the coil remote from the supporting arm. No part of the tracer mechanism, except the follower 16, extends below the edge of the template. The magnetic flux is concentrated the more strongly to attract the follower to the template, and it is not necessary to pass the coil through the opening in the template as required in certain earlier types of magnetic tracers. This construction of the follower magnet makes possible a wider choice of forms of templates by which to cut a given shape. It materially simplifies the template problem. The magnetic casing 46 overhanging the steel or iron plate template 48 also aids in supporting templates of fairly thin section.

The operation of this machine is as follows:

A cam or template 48 is passed beneath the base 1 and raised so that post 3 passes through a hole in the template, and the template is secured to the base by screws 49 which may be threaded into the template or passed through the template and secured by nuts on the bottom. A template for cutting a simple shaft is shown, but it may be understood that more complicated templates or guides will be required for many shapes and designs.

Supporting the plate template outward from the base part of the machine adjacent the surface against which the base rests, makes it easily possible to provide additional support for the template by blocks or the like, or even by resting the template flat against the underlying surface.

The metal to be cut is placed in position beneath the torch 8 and the torch ignited in the usual manner. The torch is then raised or lowered to its proper position by the hand wheel 50, which operates a rack and pinion in the conventional manner. Template follower 16 is then brought into position at the starting point on the template, and made to adhere to it by energizing the magnet coil 55 by means of switch 10. When the cutting operation has been started in the usual manner, follower 16 is started rotating by turning on switch 11.

The natural way to move this machine would be by the double arm 6. To prevent the base 1 and the hinged arms from pivoting around their various bearing points, causing the magnet to strike against the base and damaging the machine, lug 51 is cast on center pedestal 2, lug 52 is cast on gear box 14, and lug 53 is cast on double arm 6. These lugs are drilled so as to aline when the machine is folded, so that pin 54 can be inserted, tying the machine together when it is being transported.

The machine is not limited to operation in a horizontal plane. It can be set so as to make cuts in work the face of which is vertical or inclined.

It will be observed that in this machine the electromagnetic template follower is removed from the heat of the cutting operation, also that when the arms are folded the working space is cleared so that heavy pieces of work can be brought up and deposited by a crane in position for cutting.

It will be understood that the invention is not limited to the precise construction which has been illustrated and described, and that parts and subcombinations of the invention may be used in specifically different forms of machines of the general character described. It will also be evident that the machine can be used for automatic welding operations by inserting an ordinary welding torch in the torch holder.

I claim:

1. A machine of the character described, comprising a support, a double arm swung on said support, a torch-bearing arm and a follower arm swung on the two parts of said double arm, a motor-driven rolling tracer or follower on said follower arm, and a belt interconnecting said torch-bearing and follower arms for movement in unison relative to said double arm.

2. A machine of the character described, comprising a support, a double arm swung on said support, a torch-bearing arm and a follower arm swung on the two parts of said double arm, a motor-driven rolling tracer or follower on said follower arm, a belt interconnecting said torch-bearing and follower arms for movement in unison relative to said double arm, and means for continually and automatically taking up slack in both courses of said belt.

3. A machine of the character described, comprising a support, a double arm swung on said support, a torch-bearing arm and a follower arm swung on the two parts of said double arm, a motor-driven rolling tracer or follower on said follower arm, and a belt interconnecting said torch-bearing and follower arms and having pinned connection therewith.

4. A machine of the character described, comprising a support, a double arm swung on said support, a torch-bearing arm and a follower arm swung on the two parts of said double arm, a motor-driven rolling tracer or follower on said follower arm, a flexible band interconnecting said torch-bearing and follower arms and having pinned connection therewith, and means for continually and automatically taking up slack in both courses of said band.

5. A machine of the character described, comprising a support, a double arm swung on said support, a torch-bearing arm swung on one part of said double arm, a follower arm swung on the other part of said double arm, a motor-driven electromagnetic template follower on said follower arm, and a flexible belt interconnecting said torch-bearing arm and said follower arm.

6. In a machine of the character described, a support, a double arm swung on said support, a torch-carrying arm swung on one part of said double arm, a follower arm swung on the other part of said double arm, means interconnecting said arms, a template follower and a motor for driving the same on one of said arms, and means for locking said follower arm, said base and said double arm together in folded condition.

7. In a machine of the character described, the combination of a support, a double arm swung on said support, two arms swung on said double arm, a belt interconnecting said two arms, a rotative belt-tightening member, a spring acting on said belt-tightening member, and two rollers on said belt-tightening member at opposite sides of the center acting simultaneously against the two courses of said belt.

8. In a machine for causing a torch supported on the machine to be moved at uniform speed in any and changing directions in a plane by and in accordance with the movement of a motor-driven tracer elsewhere on the machine, the combination with a primary support, of means carried thereon to complete therewith a plurality of single-plane universal mechanisms respectively carrying holders for said torch and tracer, said means comprising pivotal arms, and a flexible belt connecting the pivotal portions of said arms to compel them to swing in unison and cause the torch to move over the work in a path closely reproducing that traversed by the tracer.

9. A metal cutting or welding machine for moving a torch in accordance with the movement of a tracer, including a support; two jointed arms pivotally connected with the support; a tracer; a cutting torch; holders for the tracer and cutting torch, the holders being supported by the jointed arms for universal movement in a plane; and connections between the arms for causing them to swing together so that the torch follows a path similar to that followed by the tracer, said connections including a wheel carried by each jointed arm, and a belt passing around both wheels.

10. In a machine for causing a torch supported on the machine to be moved at uniform speed in any and changing directions in a plane by and in accordance with the movement of a motor-driven tracer elsewhere on the machine, the combination with a primary support, of universal-motion mechanism movably mounted on said primary support and carrying holders for said torch and tracer, said mechanism comprising pivotal arms, a wheel connected with each arm concentric with corresponding pivotal axes of the arms, and a flexible belt passing around both of the wheels to compel the wheels and arms to oscillate in unison so that the torch will move over the work in a path similar to that traversed by the tracer.

11. A metal cutting or welding machine for moving a torch in accordance with the movement of a tracer, including a support; two jointed arms pivotally connected with the support; a tracer and a cutting torch connected with the respective jointed arms for universal movement in a plane; and connections including a flexible member having two sections which are operatively connected with both arms on opposite sides of the pivot of each arm so that the connections cause the arms to swing together and the torch to move over the work in a path similar to that followed by the tracer.

12. A magnetic tracer including a drive shaft; a roller at one end of the drive shaft; a motor operatively connected with the shaft; an elongated bearing for the shaft, said bearing being of magnetic material; an electromagnet surrounding the bearing so that the bearing forms a core part of the magnet; a casing of magnetic material around the outside of the magnet; a head of magnetic material over the end of the magnet remote from the roller and connecting with the core and casing to form a closed magnetic circuit at that end of the magnet; a protective covering over the roller end of the magnet, said covering being of non-magnetic material so that the magnetic circuit between the roller ends of the core and casing is open; and a template of magnetic material, the outside casing of the magnet extending close to the surface of the template to intensify the magnetic flux in the template at right angles to the axis of the roller so that the roller is more strongly attracted to the template.

13. A cutting or welding machine including a torch; means supporting the torch for universal movement in a plane; a tracer; means supporting the tracer; motion-transmitting connections between the tracer and the torch for causing the torch to follow a path similar to that followed by the tracer; and resilient means associated with the motion-transmitting connections for maintaining said connections taut so that the torch will always move in accordance with the tracer.

14. A cutting or welding machine including a torch; a holder supporting the torch for universal movement in a plane; a tracer; a holder supporting the tracer for universal movement in a plane; connecting means, including a flexible member, between the torch and tracer holders for causing the torch to move in a path similar to that followed by the tracer; and resilient means for maintaining the flexible member taut so that the torch will accurately follow the movements of the tracer.

15. A cutting or welding machine including a torch; a holder supporting the torch for universal movement in a plane; a motor-driven uniform-speed tracer; a holder supporting the tracer for universal movement in a plane; connecting means, including a belt, between the torch and tracer holders for causing the torch to move in a path similar to that followed by the tracer; an idler roller contacting with a run of the belt; and supporting means urging the roller into contact with the belt to tension the belt so that the torch will always travel with the same uniform speed as the tracer.

16. In a machine of the character described, a support universally movable in a plane; an electromagnet comprising a casing of magnetic material carried by said support; a magnetizing coil contained non-rotatably in said casing; a rotary shaft passing axially through said casing and having a magnetic template follower roller at one end; drive mechanism connected with the opposite end of said shaft; a protective covering of non-magnetic material for this end of said coil; a head of magnetic material connected with the opposite end of said casing and forming with the casing and the shaft a magnetic circuit open at the end adjacent the roller and closed at the opposite end.

17. In a machine of the character described, a support universally movable in a plane; a magnetic tracer connected with the support for moving said support in any and changing directions, said tracer comprising a drive shaft and a bearing for said shaft, one of which forms the core of a magnet; a roller at one end of the drive shaft; a motor operatively connected with the shaft; an electromagnet coil surrounding the shaft so that the shaft axis is coincident with the axis of the magnet; a casing of magnetic material around the outside of the magnet; a head of magnetic material over the end of the magnet remote from the roller and connecting the core and casing to form a closed magnetic circuit at that end of the magnet; a template of magnetic material, the outside casing of the magnet extending close to the surface of the template to intensify the magnetic flux in the template at right angles to the axis of the roller so that the roller is strongly attracted to the template as it rolls on the template to move the support in any and changing directions.

18. In a machine of the character described, a support universally movable in a plane; a motor and a housing carried by the support; gearing in the housing operated by the motor; a magnetizing coil; a magnetic casing connected with the housing and non-rotatable with respect to the housing; a magnetizing coil fixed in the casing; a rotatable shaft extending through the coil and forming a core part of the magnet, said shaft extending beyond both ends of the coil and having one end operatively connected with the gearing; a head of magnetic material over the end of the coil nearest the gearing, said head contacting with the magnetic casing and the shaft to form a closed magnetic circuit at that end of the coil; and a template follower roller on the end of the shaft remote from the gearing.

JAMES L. ANDERSON.